United States Patent [19]

Fang

[11] 3,928,420

[45] Dec. 23, 1975

[54] MIXED ESTERS OF POLYBASIC SATURATED ACIDS, GLYCOLS AND GLYCIDYL ESTERS

[75] Inventor: James C. Fang, Media, Pa.

[73] Assignee: E. I. Du Pont de Nemours & Company, Wilmington, Del.

[22] Filed: June 12, 1973

[21] Appl. No.: 369,174

[52] U.S. Cl. ...... 260/475 P; 260/67.6 R; 260/70 R; 260/77.5 AN; 260/404.8; 260/485 G; 428/425; 428/436; 428/524
[51] Int. Cl.$^2$ .................. C07C 69/30; C07C 69/80
[58] Field of Search ...................... 260/475 P, 404.8

[56] References Cited
UNITED STATES PATENTS

| | | | |
|---|---|---|---|
| 3,304,347 | 2/1967 | McGary et al. | 260/475 P |
| 3,414,635 | 12/1968 | Edwards et al. | 260/475 P |
| 3,433,824 | 3/1969 | Horsley | 260/475 P |
| 3,654,224 | 4/1972 | Milgrom | 260/475 P |
| 3,699,064 | 10/1972 | Cunningham | 260/22 EP |

FOREIGN PATENTS OR APPLICATIONS 942,465   11/1963   United Kingdom

*Primary Examiner*—Lorraine A. Weinberger
*Assistant Examiner*—E. Jane Skelly

[57] ABSTRACT

Mixed esters of polybasic saturated acids, glycols and glycidyl esters, when formulated with polyfunctional isocyanates or aminoplast resins, form coating compositions which require little or no organic liquid carrier. These compositions are useful for finishing automobiles and appliances and for general industrial use.

8 Claims, No Drawings

MIXED ESTERS OF POLYBASIC SATURATED ACIDS, GLYCOLS AND GLYCIDYL ESTERS

BACKGROUND OF THE INVENTION

There has been much emphasis in recent years on developing coating compositions which do not pollute the atmosphere as they dry. This has become increasingly important with the passage of legislation strictly limiting the amounts and kinds of organic liquids that can be emitted during industrial finishing operations.

The esters of my invention, when formulated with polyisocyanates or aminoplast resins, form coating compositions which require little or no organic liquid carrier to bring them to application viscosity. This places my compositions in the forefront of technology, for they emit a minimum of volatiles into the air as they cure.

Their low carrier content also carries with it additional benefits. Since my compositions contain a high level of solids, the saving in shipping costs is considerable. Their high solids content also makes it possible, in spray applications, to apply more of the compositions per pass of the spray gun, thereby saving much in labor costs.

My compositions also have the advantage of being compatible with most conventional mill bases used in the paint industry.

In addition, when cured, my compositions give hard, durable, glossy, flexible finishes with excellent adhesion to unprimed metal.

All these properties suit my compositions for use in topcoating automobiles, for finishing appliances, metal furniture, wood and plastics, and for coil coating operations.

SUMMARY OF THE INVENTION

The esters of my invention are the mixed esters of saturated polybasic acids with glycols and with glycidyl esters. More particularly, my esters are those represented by the structural formula (1) 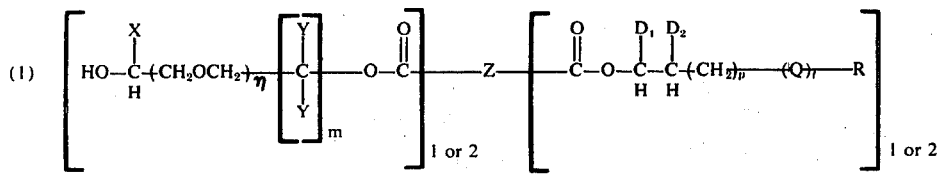

where
X is hydrogen, an alkyl radical of 1–4 carbon atoms or phenyl;
Y is hydrogen, —OH, —CH$_2$OH or an alkyl radical of 1–4 carbon atoms (only one Y can be —OH);
Z is $+CH_2+_{2-10}$
or

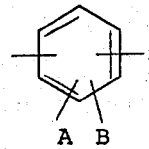

where

A and B can be the same or different and are hydrogen, —COOH or an open valence;
D$_1$ is hydrogen or —CH$_2$OH;
D$_2$ is hydrogen or —OH; (but one of D$_1$ or D$_2$ must be —OH or —CH$_2$OH)
Q is

or —O—
R is an alkyl radical of 4–18 carbon atoms, or a singly, doubly or triply unsaturated hydrocarbon radical of 17 carbon atoms;
n is 0 or 1;
m is 1–5;
p is 0 or 1;
and
t is 0 or 1.

The mixed esters I prefer for the uses disclosed are those represented by formula (1) where
a. Z is $+CH_2+_7$ or

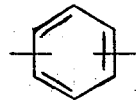

X is hydrogen, n is 0, m is 1 and Y is hydrogen and hydrogen;
b. Z is $+CH_2+_7$ or

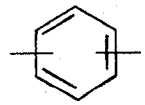

X is hydrogen, n is 0, m is 1 and Y is —CH$_3$ and hydrogen;
and
c. Z is $+CH_2+_7$ or

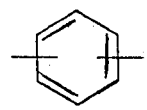

X is hydrogen, n is 0, m is 2 and Y is (1) hydrogen and —OH and (2) hydrogen and hydrogen;
and for each of (a), (b) and (c)
D$_1$ is hydrogen, D$_2$ is —OH, p is 1, Q is

t is 1 and

-continued

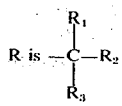

where $R_1$ is —$CH_3$ and $R_2$ and $R_3$ are lower alkyl, the total number of carbon atoms in $R_1$, $R_2$ and $R_3$ being 7–11.

PREPARATION OF THE ESTERS

I first react about 1 mol of a suitable polybasic saturated acid with about 1 mol of a suitable polyol according to the illustrative equation (2) 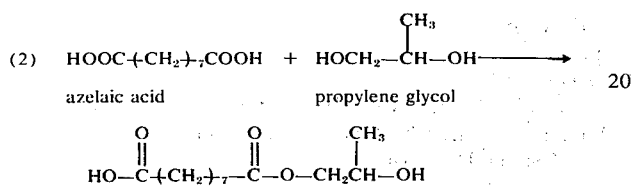

I catalyze this reaction with about 0.25%, by weight, of toluenesulfonic acid, phosphoric acid, tetrapropyl titanate or dibutyltin oxide. I also add about 0.05%, by weight, of an addition polymerization inhibitor such as p-methoxyphenol or hydroquinone.

I mix the acid and glycol and then hold this mixture at 135°–146°C., under nitrogen, until about 1 mol of water has been given off. In the usual case this takes about 45 minutes to 1 hour.

I then react about 1 mol of the resulting intermediate with 0.4 to 1.0 mol of a glycidyl ester, a glycidyl ether or an alkylene oxide, according to the illustrative equation (3) 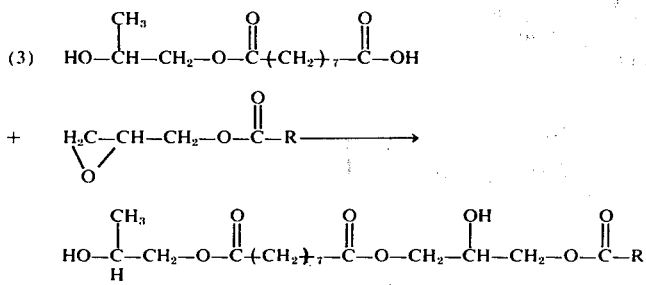

[where R is as in formula (1).]

I mix these reactants and then heat the mixture to 180°–200°C., under nitrogen, and hold it at that temperature for about 1 hour. Preparation of my ester is then complete.

Illustrative of the polybasic saturated acids I use are azelaic, sebacic, adipic, dodecandioic, phthalic (all isomers), trimellitic, pyromellitic, and anhydrides of these. I prefer to use azelaic acid, phthalic anhydride and trimellitic anhydride.

Illustrative of polyols which can be used are ethylene glycol, 1,2-propanediol, 1,3-propanediol, 1,4-butanediol, 1,5-pentanediol, glycerol, 1,2,3-butanetriol, 1,2,3,4-butanetetrol, 1,6-hexanediol, neopentyl glycol, diethylene glycol, trimethylolpropane and trimethylpentanediol. I prefer to use ethylene glycol, 1,2-propanediol or glycerol.

Illustrative of the glycidyl compounds which can be used are esters of glycidol with monobasic acids of 4–18 carbon atoms, such as glycidyl palmitate, glycidyl laurate and glycidyl stearate; alkylene oxides of 4–18 carbon atoms such as butylene oxide; and glycidyl ethers such as octyl glycidyl ether.

When R in formula (1) is an unsaturated hydrocarbon radical, I use as the reactant a glycidyl ester represented by the structure

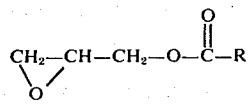

where R is a singly, doubly or triply unsaturated hydrocarbon radical of 17 carbon atoms.

This ester can be prepared by the reaction of a suitable soap with epichlorohydrin. When the soap is derived from a naturally occurring oil such as linseed oil, soya oil, safflower oil, tall oil or chinawood oil, the glycidyl ester, and the final product it gives, is a mixture of compounds whose R groups vary from each other, the variance depending on the nature of the oil.

I especially prefer to use a mixed glycidyl ester known as "Cardura E" ester[1] which is represented by the structure

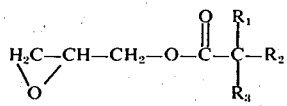

where $R_1$ is —$CH_3$ and $R_2$ and $R_3$ are lower alkyl, the total number of carbon atoms in $R_1$, $R_2$ and $R_3$ being 7–11.

1. Sold by Shell Chemical Company.

It will be apparent from the foregoing equations that small amounts of isomers of the product shown will be formed. For example, the intermediate, for the most part, opens the cyclic ether ring by reaction with the carboxyl group, as shown in equation (3). However, some rupturing is brought about by reaction with the hydroxyl group on the intermediate. This isomeric form is not represented by formula (1) because such small quantities are produced, but I nevertheless consider it to be a part of my invention.

Similarly, the alkyl groups of X and Y in formula (1) can vary in position according to which hydroxyl group of an unsymmetrical glycol is attacked by the acid when the two are reacted as shown in equation (2).

These isomeric forms can be isolated from the main product by chromatographic techniques, if this is desired. But I have found that isolation is unnecessary because all of the isomers are useful for the purposes I have already described. Indeed, the presence of these isomeric forms in some cases makes the compositions compatible with a wider variety of film-formers and lowers their viscosity. I therefore prefer and recommend that the various isomers not be isolated.

In preparing my esters, one may use mixtures of acids, of glycols and of glycidyl compounds if he wishes to obtain a balance of properties. Suitable mixtures and the proportions of their components will be immediately apparent to anyone versed in the polymer or paint art.

HOW MY MIXED ESTERS ARE USED

To prepare a coating composition, I mix the product of the foregoing preparation scheme with polyisocyanate or a conventional aminoplast resin.

The isocyanate I used in my composition can be any aromatic or aliphatic polyfunctional isocyanate capable of reacting with the diester to form a crosslinked network. Illustrative of such an isocyanate are toluene diisocyanate

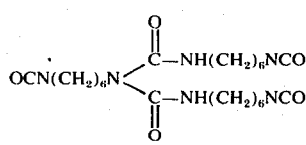

("Desmodur N", sold by Farbenfabriken Bayer, A.G.)

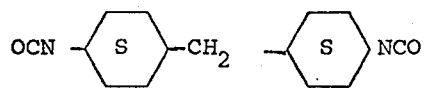

("Hylene" W organic isocyanate, sold by E. I. du Pont de Nemours and Company)

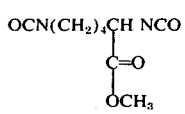

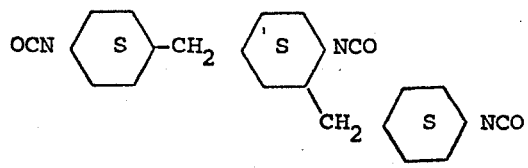

OCN(CH₂)₃₆NCO

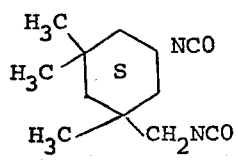

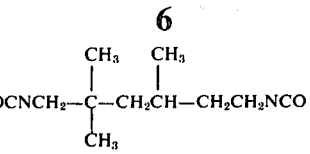

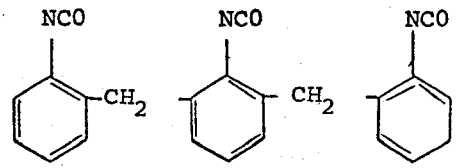

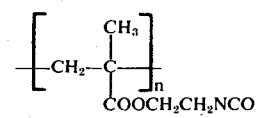

where $n$ is 2–100

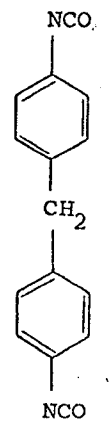

Mixtures of isocyanates can also be used.

Thee isocyanates I prefer to use in my composition are

"Desmodur N"

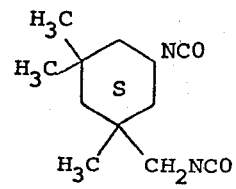

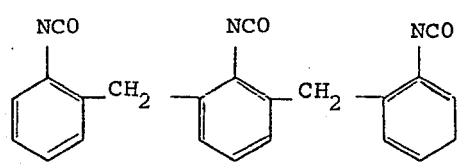

and

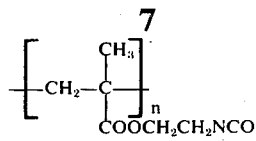

Most of the polyfunctional isocyanates are available in the marketplace. Those which cannot be purchased can be made according to any of the methods well known in the art.

I make a coating composition using an isocyanate by bringing together suitable amounts of an ester of formula (1), or a mixture of such esters, and an isocyanate. I use enough polyisocyanate to provide about 0.8–1.2 equivalent weights of isocyanate radical for each hydroxyl radical in the composition. I also add to this mixture about 0.02–1%, preferably about 1%, by weight, of a hydroxyl-isocyanate reaction accelerator such as tin octoate or dibutyltin dilaurate.

In all steps of preparing my coating composition it is important to keep out water, for its presence will cause premature curing and gelation.

Because the diester and the isocyanate react rapidly, this coating composition, in practice, is a system of two separate entities or packages, the first comprising the diester, the accelerator and whatever pigments and adjuncts are used, and the second the isocyanate. These are brought together in the proper ratio just before the composition is to be used.

If one wishes to prepare a one-package system, the polyisocyanate can be replaced with a molar equivalent amount of a phenol- or ketoxime blocked isocyanate, or mixture of blocked isocyanate.

The aminoplast resin I use in my composition can be any such resin ordinarily used in formulating coating compositions. Illustrative are melamine-formaldehyde resins, benzoguanamine-formaldehyde resins, urea-formaldehyde resins, melamine toluenesulfonamide resins, hexamethoxymethylmelamine resins, or any of the alkylated malamine formaldehyde, benzoguanamine-formaldehyde or urea-formaldehyde resins. I prefer to use a hexamethoxymethylmelamine resin.

I prepare the coating composition using an aminoplast resin by mixing about 50–80%, by weight of the total solids, of my diester with about 20–50%, by weight of the total, of the aminoplast resin.

With either the isocyanate or aminoplast composition, I add a pigment, if this is desired, by way of a conventional mill-base. This mill-base can be based, for example, on an alkyd resin or a low molecular weight acrylic resin. The amount of mill-base used is conventional and will depend on the depth of color desired. Generally speaking, no compatibility problems will be encountered, for my coating composition is compatible with most mill-bases conventionally used in the industry.

I find that adjuncts such as coalescing aids, flow agents, lubricants and the like are ordinarily not needed, but such things can be added in the usual amounts if their presence appears desirable.

All that is required to reduce my coating composition to spray application viscosity is to heat it to approximately 40°–55°C. The composition can also be reduced to spray viscosity by the addition of such conventional thinners as toluene, methylethyl ketone or acetone. In general, this causes no problems for my composition is also compatible with most such organic liquids. However, I usually find this dilution to be unnecessary, for it only introduces organic liquids into my composition which the law now requires to be at low concentration or completely absent, and whose presence confers few or no advantages.

However my composition is thinned, it is ordinarily sprayed to whatever substrate is being coated, although other techniques such as brushing, dipping, roller-coating or doctor-blading can be employed. If spray application is the method of choice, those skilled in the art will be pleased to note that no special spraying equipment or techniques are required. My composition can be conventionally sprayed with no loss of quality or economy.

The thickness to which my composition is applied is largely a matter of choice, but, as already mentioned, it is possible in most cases to apply a somewhat thicker coat than is the rule with a conventional coating composition without the accompanying sagging and running.

My composition, however it is applied, is then cured as follows:

a. isocyanate composition — air dry for about four hours or bake for 2–40 minutes at 120°–260°C., the lesser time requiring the higher temperature;

b. aminoplast composition — bake about 30 minutes at 120°–180°C.

DESCRIPTION OF THE PREFERRED EMBODIMENTS

Those skilled in the polymer and paint art will be able to practice my invention with greater ease after having read the following illustrative examples. I recognize that these artisans will be able to compose numerous variations on the examples' theme, such as the introduction of substituents, not shown here, onto the basic molecule, and the use of conventional adjuncts. I consider all of these variations to be within my inventive concept.

In these examples, all parts are by weight.

EXAMPLE 1

Into a reaction vessel were charged, with mixing

| | |
|---|---|
| Phthalic anhydride | 296 parts |
| Propylene glycol | 152 |

The mixture was brought to a temperature of 140°C. and held there for 10 minutes. Four hundred parts of "Cardura E" were added slowly, with stirring, and the temperature was then raised to 160°–180°C. and held there for 1 hour. The product was a clear yellow liquid.

EXAMPLE 2

A coating composition was prepared by mixing together

| | | |
|---|---|---|
| Product of Example 1 | 98 | parts |
| "Desmodur N" Solution (32% in xylene - cellosolve acetate 1/1) | 213.5 | |
| Mill base - blue[1] | 25.0 | |
| Mill base - metallic[2] | 7.0 | |
| Dibutyltin dilaurate | 5.0 | |

1 and 2 — Made by conventional alkyd mill base technology.

This mixture was filtered through cheesecloth and sprayed to a glass plate to a thickness of 1–2 mils (dry).

The plate was then baked for 40 minutes at 120°C. to give a glossy, hard finish.

I claim:

1. A compound represented by the structure

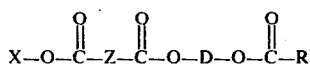

where
X is the residue of
ethylene glycol
1,2-propanediol
1,3-propanediol
1,4-butanediol
1,5-pentanediol
glycerol
1,2,3-butanetriol
1,2,3,4-butanetetrol
1,6-hexanediol
neopentyl glycol
diethylene glycol
trimethylolpropane or
trimethylpentanediol;
D is

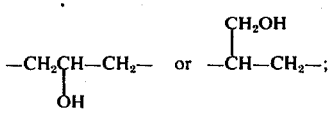

R is an alkyl radical of 4–18 carbon atoms, or a singly, doubly or triply unsaturated hydrocarbon radical of 17 carbon atoms;
and
Z is

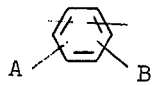

where A and B can be the same or different and are hydrogen or —COOH.

2. The compound of claim 1 wherein X is the residue of ethylene glycol.

3. The compound of claim 1 wherein X is the residue of 1,2-propanediol.

4. The compound of claim 1 wherein X is the residue of glycerol.

5. The compound of claim 1 wherein
D is

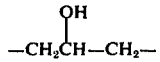

and
R is

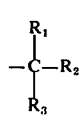

where $R_1$ is —$CH_3$ and $R_2$ and $R_3$ are lower alkyl, the total number of carbon atoms in $R_1$, $R_2$ and $R_3$ being 7–11.

6. The compound of claim 2 wherein
D is

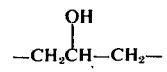

and
R is

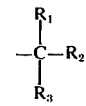

where $R_1$ is —$CH_3$ and $R_2$ and $R_3$ are lower alkyl, the total number of carbon atoms in $R_1$, $R_2$ and $R_3$ being 7–11.

7. The compound of claim 3 wherein
D is

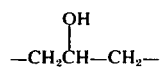

and
R is

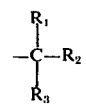

where $R_1$ is —$CH_3$ and $R_2$ and $R_3$ are lower alkyl, the total number of carbon atoms in $R_1$, $R_2$ and $R_3$ being 7–11.

8. The compound of claim 4 wherein
D is

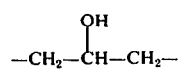

and
R is

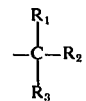

where $R_1$ is —$CH_3$ and $R_2$ and $R_3$ are lower alkyl, the total number of carbon atoms in $R_1$, $R_2$ and $R_3$ being 7–11.

* * * * *